Figure 1:
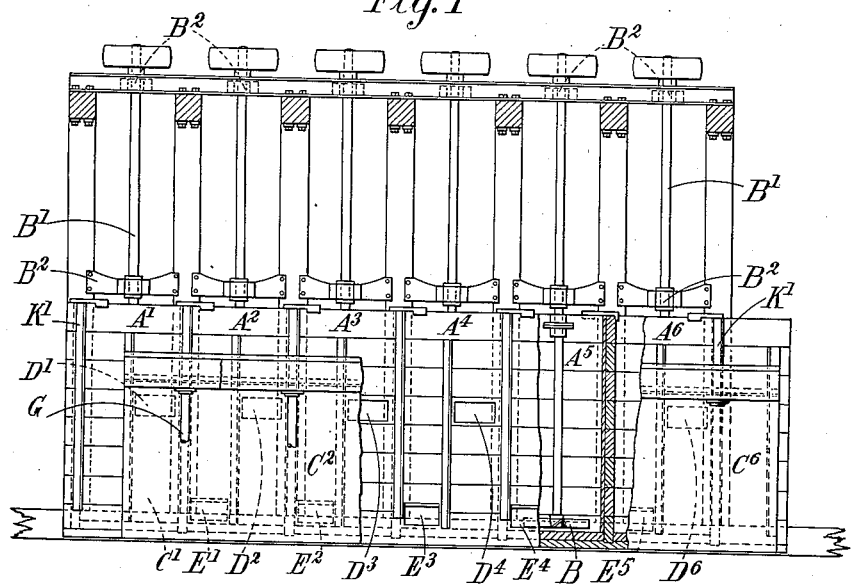

J. HEBBARD.
APPARATUS FOR ORE CONCENTRATION.
APPLICATION FILED OCT. 1, 1912.

1,064,209.                    Patented June 10, 1913.

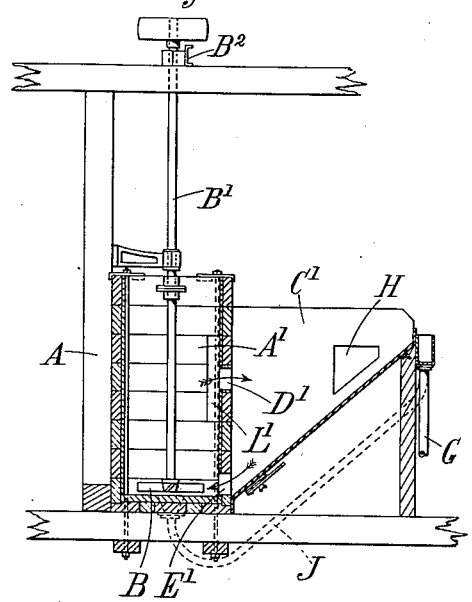

UNITED STATES PATENT OFFICE.

JAMES HEBBARD, OF BROKEN HILL, NEW SOUTH WALES, AUSTRALIA, ASSIGNOR TO MINERALS SEPARATION LIMITED, OF LONDON, ENGLAND.

APPARATUS FOR ORE CONCENTRATION.

1,064,209.  Specification of Letters Patent.  Patented June 10, 1913.

Application filed October 1, 1912. Serial No. 723,327.

*To all whom it may concern:*

Be it known that I, JAMES HEBBARD, a subject of the King of England, residing at Broken Hill, New South Wales, Commonwealth of Australia, have invented certain new and useful Improvements in Apparatus for Ore Concentration, of which the following is a specification.

This invention is for improvements in or relating to apparatus for ore concentration, and more particularly to apparatus for carrying out the well-known flotation process as described for example in the previous U. S. Patents No. 835,120, granted November 6, 1906, and No. 962,678, granted June 28, 1910.

The apparatus is a development from that described in the previous U. S. Patents No. 953,746, granted April 5, 1910, and No. 979,857, granted December 27, 1910.

Referring to the previous Patent No. 979,857 it will be seen that a number of mixing vessels or agitator boxes are arranged on the same level. These discharge respectively into spitzkasten on a lower level. The tailings outlet from the first of these spitzkasten is connected by a conduit to the center of the bottom of a secondary mixing vessel whereby the pulp is drawn into said secondary mixing vessel and so on.

The object of this invention is to simplify this type of apparatus and to render it more efficient and capable of new uses: For example, one object is to dispense with the under pipes connecting the spitzkasten to the mixing vessels or agitator boxes.

Broadly stated this invention comprises the combination with two adjacent mixing vessels each containing a rotary agitator of a spitzkasten placed contiguous thereto having a high level orifice leading from the first mixing vessel to the spitzkasten and a low level orifice leading from the spitzkasten to the bottom of the second mixing vessel.

In the earlier arrangement above referred to the apices of the spitzkasten were carried down to a considerably lower level than the bottom of the mixing vessels, but in this invention the mixing vessels and spitzkasten are preferably on the same level, that is, the bottoms of the spitzkasten are substantially on a level with the bottoms of the mixing vessels. Thus a practical form of apparatus embodying this invention comprises a number of mixing vessels substantially on the same level and side by side, a number of spitzkasten also on the same level contiguous to the mixing vessels but staggered in relation to them, a high level outlet from each mixing vessel to the next spitzkasten and a low level outlet from that spitzkasten to the bottom of the next mixing vessel. It will be seen that in each mixing vessel the agitator in addition to its usual agitating, mixing and aerating functions, has to perform the function of circulating the pulp from the low level inlet to the high level outlet, and the blades of the agitator are so inclined and so placed as to give this result. Thus they may be flat radial blades inclined at an angle and rotating so that their upper faces advance thus tending to drive the pulp up to the high level outlet and to draw it in from the low level orifice.

Figure 2:
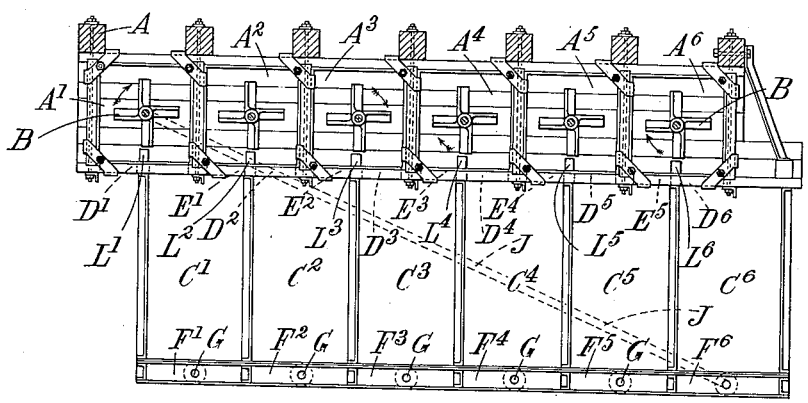

The following is a description by way of example of one form of apparatus embodying this invention, and in the accompanying drawings, Figure 1 shows an elevation partly in section, Fig. 2 a plan, and Fig. 3 a sectional side elevation, of the apparatus.

A series of mixing vessels or agitator boxes $A'$, $A^2$, $A^3$, $A^4$, $A^5$, $A^6$ are arranged side by side and preferably on the same level. Thus they may be one long box divided up by vertical partitions $K'$ into separate vessels. These vessels are conveniently much deeper than in the earlier arrangement referred to. Each vessel contains a vertical rotary shaft $B'$ supported in bearings $B^2$ and having a horizontal blade agitator B at the bottom thereof, the flat blades being tilted so as to give an upward circulation of the contained pulp. Alongside of the mixing vessels and preferably in front are a number of spitzkasten $C'$, $C^2$, $C^3$, $C^4$, $C^5$, $C^6$, substantially on the same level, *i. e.*, with the bottoms of the spitzkasten sloping up from the bottoms of the vessels. These spitzkasten are staggered in relation to the vessels, *i. e.*, the first spitzkasten contacts with half the first mixing vessel and with half the second. The second spitzkasten contacts with half the second vessel and half the third and so on. At a convenient point in the height of the first mixing vessel, say half way up is a high level orifice $D'$, or outlet, leading into the first spitzkasten. At the bottom of the other half of the first spitzkasten is an orfice $E'$ leading into the bottom of the second mixing vessel and so on. Each spitzkasten is thus provided with two orifices one at a high level by which the agitated pulp is passed from one agitating box to it, and the other at a lower level by which the pulp which sinks passes to the next agitating box in the series. The spitzkasten are provided with concentrate launders F', F², F³, F⁴, F⁵, F⁶.

The operation of the apparatus is as follows:—Crushed ore or similar finely divided mineral together with water and the frothing agent with or without acid is fed into the first agitation vessel A', where by means of the stirrers which are driven in any convenient manner, air is beaten into it. The agitated pulp then passes into the first spitzkasten C' through the high level orifice D', being lifted to the necessary level by the shaping of the blades of the agitator B. In the spitzkasten the first froth floats and flows into the concentrate launder F'; the pulp which sinks in the first spitzkasten passes through the lower orifice E' into the bottom of the second mixing vessel A² where it receives further agitation and from which it is discharged by the high level orifice D² into the second spitzkasten C² and so on. Thus, by the action of the stirrers B and gravitation, circulation is produced and maintained throughout the series of agitation vessels and spitzkasten.

Preferably each of the collecting launders F', F², F³, F⁴, F⁵, F⁶, for the froth or overflow is provided with a pipe G for the removal of the froth therefrom. If it be necessary to retreat any of these overflows they may be led back by a conduit J to the bottom of the first or other mixing vessel.

There may be provided in the agitation vessels A', A², A³, A⁴, A⁵, A⁶, baffles or guide plates L', L², L³, L⁴, L⁵, L⁶ in order to prevent the ore pulp, during agitation, from being carried around past the orifices E', E², E³, E⁴, E⁵, E⁶ leading to the spitzkasten. As shown in Fig. 3, these baffles or guide plates do not extend to the bottom of the mixing vessels, that is to say, they do not extend down to the lower orifices.

The material fed to the various mixing vessels may be as desired. Thus water, crushed ore, acid, mineral frothing agents and so forth, may be added to any of the various mixing vessels as required, and in any suitable order.

The spitzkasten may be interconnected by small orifices H to maintain a constant level or overflow or not as desired.

Outlets such as sliding valves or the like may be provided at the bottom of the spitzkasten for the removal of the contents and other modifications in the details of construction and arrangement may be made without departing from the spirit of this invention. Further, it is to be understood that the apparatus hereindescribed and specified may be used either alone or in conjunction with the apparatus according to other patents referred to and enumerated in the specification. For example, the concentrates obtained from this apparatus may be passed on and retreated in a similar but smaller unit, or in one of the plants of well known design hereinbefore referred to, or in a combination of such plant with one according to the present invention.

What I claim as my invention and desire to secure by Letters Patent is:—

1. Apparatus for concentrating ores by gaseous flotation of certain mineral particles in liquid, comprising in combination two adjacent mixing vessels each containing a rotary agitator and a spitzkasten placed contiguous thereto having a high level orifice leading from the first mixing vessel to the spitzkasten and a low level orifice leading from the spitzkasten to the bottom of the second mixing vessel.

2. Apparatus for concentrating ores by gaseous flotation of certain mineral particles in liquid comprising in combination two adjacent mixing vessels each containing a rotary agitator, and a spitzkasten placed contiguous thereto and on the same level, having a high level orifice leading from the first mixing vessel to the spitzkasten and a low level orifice leading from the spitzkasten to the bottom of the second mixing vessel.

3. Apparatus for concentrating ores by gaseous flotation of certain mineral particles in liquid comprising in combination a number of mixing vessels, a number of spitzkasten contiguous thereto and on the same level, staggered in relation to the mixing vessels, having a high level outlet from each mixing vessel to the next spitzkasten and a low level outlet from that spitzkasten to the bottom of the next mixing vessel.

4. Apparatus for concentrating ores by gaseous flotation of certain mineral particles in liquid comprising in combination a number of mixing vessels, each containing a rotary agitator having blades shaped to give an upward circulation to the pulp, a number of spitzkasten contiguous thereto and on the same level, staggered in relation to the mixing vessels, having a high level outlet from each mixing vessel to the next spitzkasten, and a low level outlet from that spitzkasten to the bottom of the next mixing vessel.

5. Apparatus for concentrating ores by gaseous flotation of certain mineral particles in liquid comprising in combination a number of mixing vessels, each containing a rotary agitator having blades shaped to give an upward circulation to the pulp, a number of spitzkasten contiguous thereto and on the same level, staggered in relation to the mixing vessels, having a high level outlet from each mixing vessel to the next spitzkasten, a low level outlet from that spitzkasten to the bottom of the next mixing vessel and a connection between the several spitzkasten to adjust the level of the liquid therein.

6. Apparatus for concentrating ores by gaseous flotation of certain mineral particles in liquid comprising in combination a number of mixing vessels each containing a rotary agitator having blades shaped to give an upward circulation to the pulp, a number of spitzkasten contiguous thereto and on the same level, but staggered in relation to the mixing vessels, having a high level outlet from each mixing vessel to the next spitzkasten, a low level outlet from that spitzkasten to the bottom of the next mixing vessel, a connection between the several spitzkasten, to adjust the level of the liquid therein, valves at the bottom of the spitzkasten for the removal of sunken matter, and a conduit from the launders of the spitzkasten to lead back the concentrates to any one of the mixing vessels for retreatment.

In testimony whereof I have signed my name to this specification in the presence of two subscribing witnesses.

JAMES HEBBARD.

Witnesses:
H. HOWARD GREENWALD,
CHARLES W. COLLINS.